June 11, 1968 G. J. SEGUENOT 3,387,817
PACKING DEVICES FOR VALVES
Filed April 6, 1965
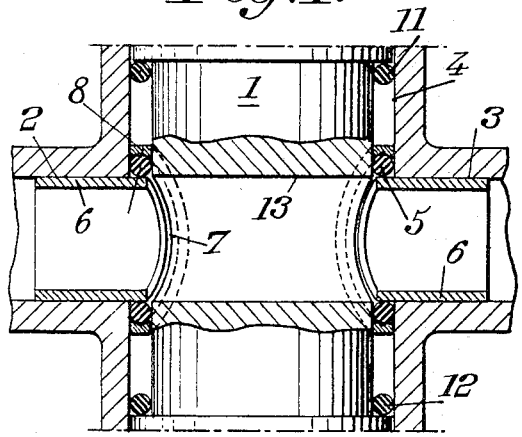
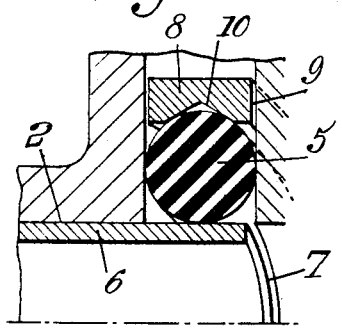 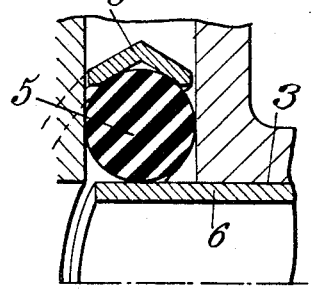
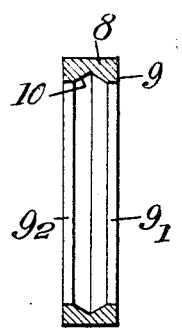 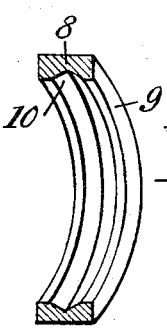

United States Patent Office 3,387,817
Patented June 11, 1968

3,387,817
PACKING DEVICES FOR VALVES
Gabriel Jean Seguenot, Paris, France, assignor to
S.E.R.T.E.C. Societe d'Etudes et de Recherches
Techniques, Paris, France
Filed Apr. 6, 1965, Ser. No. 445,880
Claims priority, application France, Apr. 9, 1964,
970,402
5 Claims. (Cl. 251—317)

ABSTRACT OF THE DISCLOSURE

A valve system having a cylindrical valve piece in the body of the valve and packing rings interposed between the end of a cylindrical tube projecting from a conduit controlled by the valve system and an annular member disposed about said tube end, the annular member being machined along the curve of intersection between the two cylindrical surfaces intersecting each other, whereas the packing ring, initially located in a plane, is deformed in a press to conform with the shape of said curve of intersection, a groove being provided in the ring to keep the annular packing member in position.

---

The present invention relates to packing devices to be provided in contact with members, and in particular rotary members, such as valve pieces (of cylindrical, conical, spherical or other suitable shape), these devices being in particular intended to be mounted around conduits opening opposite said valve piece so as to follow substantially the line of juncture between the conduit and the valve piece.

The chief object of the present invention is to provide a device of this kind which is easy to manufacture.

Such devices include, for every conduit, at least one packing member mounted in such manner as substantially to follow the above mentioned juncture line. According to the present invention, this packing member is made to bear, on the one hand, on the side turned toward the conduit axis, upon the end of a tubular support engaged in said conduit and projecting suitably toward the valve piece, and, on the other hand, toward the outside, upon an annular member engaged around said conduit end in the body intended to receive the valve piece, this annular member being arranged to be adapted to the shape of the above mentioned juncture line, the arrangement preferably being used in combination with means for holding the packing member in position, said means consisting in the provision of grooves, chamfers or the like on said annular member and/or on said end of the conduit.

Preferred embodiments of the present invention will be hereinafter described with reference to the appended drawings, given merely by way of example, and in which:

FIG. 1 is an axial sectional view of a valve having a cylindrical valve piece and provided with packing means according to the present invention;

FIG. 2 shows, in sectional view on an enlarged scale, a portion of the valve of FIG. 1;

FIG. 3 is an axial section of an annular member, after machining;

FIG. 4 is an elevational view showing said member after deformation by means of a press;

Figure 6:
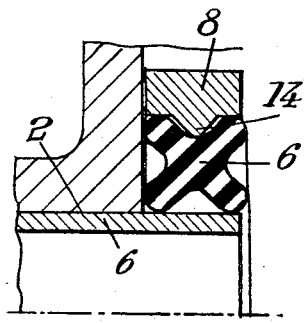

FIG. 5 diagrammatically shows a modification of the invention;

FIGS. 6 to 9 inclusive are views similar to FIG. 5 showing other modifications.

The object of the invention is to ensure fluidtightness between the valve piece 1 (which will assume to be cylindrical) of a valve and the conduits such as 2 and 3 carried by the body 4 of said valve, in which body valve piece 1 is rotatable.

It will first be recalled that systems of this kind are known wherein fluidtightness is ensured by means of a toroidal joint disposed along the line of juncture between the cylindrical annular surface of the conduit that is considered and the bore provided in the body of the valve. But the known systems lead to more or less complicated arrangements and the essential feature of the present invention is to simplify such systems.

According to the present invention, I proceed in such manner that the joint, which will be assumed to be toroidal, is mounted, for each conduit 2 or 3, inside the body 4 the bore of which is of a diameter slightly greater than that of valve piece 1, the packing member 5 being held in position by bearing:

Toward the inside, against the end of a cylindrical support 6 inserted in the corresponding conduit 2 or 3, said end projecting suitably toward the rotary valve piece 1, while leaving a suitable clearance therewith, and the edge 7 of said support 6 being adapted to the shape of the line of juncture between conduit 2 or 3 and valve piece 1 (in this case, the intersection of two cylindrical surfaces); and Toward the outside, upon a ring 8 provided around support 6 in the clearance between body 4 and valve piece 1, this ring 8 being therefore shaped to follow the above mentioned line of juncture.

The arrangement is such that packing member 5, once fitted in position, projects slightly beyond the cylindrical surface in which are located the respective edges 7 and 9 of said supports 6 and 8, so that said packing member can rub suitably against the cylindrical surface of valve piece 1.

Said ring 8 may be constituted by a plate bent into the form of a portion of a cylinder of a shape adapted to that of body 4, but it is preferable to start from a flat ring 8 which is subsequently shaped by stamping as hereinafter indicated with reference to FIGS. 3 and 4.

Furthermore, holding means should be provided for maintaining packing member 5 in position. For this purpose, I provide grooves on the respective surfaces of support 6 and/or ring 8. Such a groove is visible at 10 in ring 8, and it is preferable for constructional reasons which will become apparent hereinafter.

To make support 6 and ring 8, I preferably proceed as follows:

For the support 6, its edge will be formed by means of a milling tool of a diameter equal to that of body 4 less the thickness of the projection provided on said support inside body 4. Its fixation in conduit 2 will be obtained in any suitable manner, in particular by fitting it with a force fit. This support 6 will be generally made of a metal, but it might be made of a plastic material.

To make ring 8, I advantageously start from a tube portion as shown in FIG. 3 limited by two annular surfaces $9_1$ and $9_2$, a groove 10 being preliminarily provided between said surfaces. Then this tube portion is treated in a press between suitable shaping surfaces so as to deform it into the shape illustrated by FIG. 4, which permits of fitting it in body 4 about the end of support 6.

In FIGS. 3 and 4, for the sake of clarity, I have exaggerated the width of ring 8 with respect to its diameter.

Ring 8 may be made of a suitable metal or alloy, but I might also make use of a plastic material.

In the drawings, groove 10 is V-shaped but of course I might use any other suitable shape.

FIG. 5 shows a modification wherein ring 8 has been given by stamping a V-shaped cross section, to contribute in holding packing member 5 in position, and in this case the groove 10 of FIG. 2 is unnecessary.

I may ensure in any suitable manner the fluidtight mounting of valve piece 1 and in particular I may provide supplementary packing members as shown at 11 and 12 in FIG. 1 against flanges carried by the valve piece.

Valve piece 1 is provided in the usual manner with at least one conduit 13 for connecting conduits 2 and 3 together.

It will be noted that the invention permits of obtaining valve systems the fluidtight means of which require only very simple operations, both for machining and for assembly.

It should further be noted that the joints according to the present invention are fluidtight in both directions which permits advantageously, in a valve of the kind of that of FIG. 1, of ensuring fluidtightness by means of a single joint of packing member, for instance mounted only in conduit 2 whereas it will be unnecessary to provide one in conduit 3.

In the above description I have considered the case of joints or packing members of circular cross section.

I might also use joints of other cross section, for instance cruciform as shown by FIG. 6. In this case the bearing surface, for instance on the ring, would be different and it might be provided with a projection 14.

Figure 7:
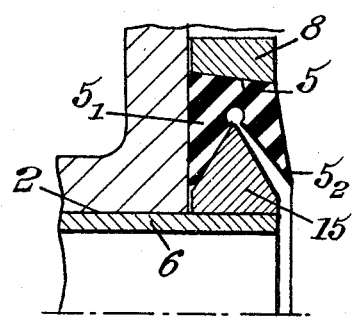
Figure 8:
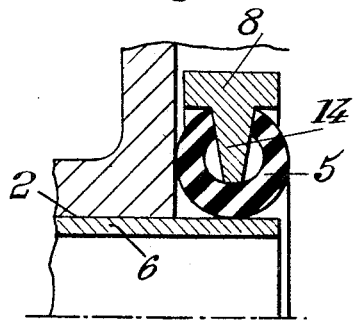
Figure 9:
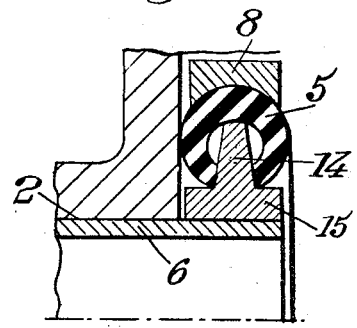

I might also provide joints of a different type for instance including lip elements or hollow packing members as illustrated by FIGS. 7 to 9, it being understood that, in all cases, holding means will be consequently provided on the interfacing pieces such as 6 and 8.

In a general manner I may provide, on the side of tube 6 a supplementary annular support, such as visible at 15 in FIGS. 7 and 9, whereby the packing member is thus held between two rings.

FIG. 7 shows a packing member 5 having lips $5_1$ and $5_2$, the cross section having the shape of a V overlapping a ring such as 15 fixed upon the end of tube 6.

FIGS. 8 and 9 show a slit tubular joint fitting upon a projection such as 14.

It should further be noted that the invention is not limited to valves having cylindrical conduits 2 and 3. These conduits might have other cross sections, for instance a rectangular cross section, as it is the case with valves having a section of passage variable in accordance with the angular position of the rotary valve, which comprises for this purpose helical or other passages.

The arrangement above described permits of simplifying the elements. Furthermore it facilitates their assembly since piece 8, whether it consists of a ring or a plate bent into cylindrical or other portion, is easily introduced and set in position inside body 4.

Furthermore a perfect fluidtightness is obtained in both directions.

In a general manner, while I have in the above description disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A valve system which comprises, in combination, a body provided with a bore of revolution about an axis and at least one conduit opening into said bore transversely thereto, a valve piece in said bore of said body and rotatable about said bore axis, said valve piece being provided with a conduit adapted to be aligned with said conduit in the body for a given angular position of said valve piece in said body, a tubular support in said conduit in said body having an end which projects towards said valve piece with clearance, a rigid annular member in said bore of said body between the body and the valve piece, said annular member being coaxial with said conduit in the body and having a substantially quadrilateral cross-section of substantially constant width in the axial direction of the conduit in the body, the width of said annular member being relatively small compared to the diametral extent thereof, said annular member having a curved shape conforming to the line of intersection of the conduit in said body and the external surface of said valve piece, said annular member being located outwards of said conduit in the body and stopping at a substantial distance short of that diametral plane of said valve piece which is perpendicular to said conduit in the valve piece, a resilient annular packing member clamped between said end of said tubular support and said annular member and remaining fixed with respect to said conduit in the body, said packing member having a shape to provide an annular seat facing the annular member, the latter including a projection corresponding to said seat and engaged therein to hold the packing member in position, said packing member being in contact with the valve piece and the body to form a seal therebetween.

2. A valve system according to claim 1 wherein said projection on the annular member is a rigid circular projection adapted to cooperate with said resilient annular packing member to hold it in position.

3. A valve system according to claim 1 wherein said resilient annular packing member is of cruciform cross section.

4. A valve system according to claim 1 wherein said resilient annular packing member has, in cross section, a V-shaped recess.

5. A valve system according to claim 1 wherein said resilient annular packing member is, in cross section, in the form of an annulus with a radial notch.

References Cited

UNITED STATES PATENTS

| | | | |
|---|---|---|---|
| 979,433 | 12/1910 | Clay | 277—206 X |
| 2,126,505 | 8/1938 | Risser | 277—206 X |
| 2,873,132 | 2/1959 | Tanner | 277—206.1 |
| 3,056,577 | 10/1962 | Kulisek | 251—317 |

FOREIGN PATENTS

| | | |
|---|---|---|
| 587,700 | 1959 | Canada. |
| 747,792 | 1956 | Great Britain. |

M. CARY NELSON, *Primary Examiner.*

M. O. STURM, *Assistant Examiner.*